United States Patent [19]

Davies et al.

[11] Patent Number: 5,219,900
[45] Date of Patent: Jun. 15, 1993

[54] COATINGS

[75] Inventors: Stephen P. Davies, High Wycombe; Graham S. Kay, Slough, both of England

[73] Assignee: Imperial Chemical Industries PLC, London, England

[21] Appl. No.: 769,525

[22] Filed: Oct. 2, 1991

Related U.S. Application Data

[63] Continuation of Ser. No. 652,482, Feb. 8, 1991, abandoned, which is a continuation of Ser. No. 527,700, May 22, 1990, abandoned, which is a continuation of Ser. No. 214,404, Jul. 1, 1988, abandoned.

[30] Foreign Application Priority Data

Jul. 2, 1987 [GB] United Kingdom ............... 8715528
May 10, 1988 [GB] United Kingdom ............... 8811058

[51] Int. Cl.$^5$ ............................................. C08L 87/00
[52] U.S. Cl. .................................... 523/201; 523/221; 524/458; 524/501; 524/522; 524/523
[58] Field of Search ............... 523/201, 221; 524/458, 524/501, 522, 523

[56] References Cited

U.S. PATENT DOCUMENTS

| | | | |
|---|---|---|---|
| 4,322,328 | 3/1982 | Graetz et al. | 524/458 |
| 4,377,661 | 3/1983 | Wright et al. | 524/522 |
| 4,403,003 | 9/1983 | Backhouse | 427/407.1 |
| 4,510,275 | 4/1985 | Ihikura et al. | 523/412 |
| 4,526,910 | 7/1985 | Das et al. | 523/220 |
| 4,537,926 | 8/1985 | Kivel et al. | 524/388 |
| 4,598,111 | 7/1986 | Wright et al. | 524/40 |
| 4,900,774 | 2/1990 | Mitsuji et al. | 524/512 |
| 4,920,175 | 4/1990 | Kanda et al. | 525/110 |
| 4,973,621 | 11/1990 | Buter | 524/460 |

OTHER PUBLICATIONS

Child, Peter "Vehicle Painter's Notes", BSP Professional Books, Sections 63 and 79.

*Primary Examiner*—Paul R. Michl
*Assistant Examiner*—John J. Guarriello
*Attorney, Agent, or Firm*—Cushman, Darby & Cushman

[57] ABSTRACT

The invention provides a base coat composition comprising a dispersion in an aqueous carrier for the composition of polymer microparticles, the polymer microparticles being a mixture of:

(a) 5 to 95% by weight of addition polymer microparticles having a crosslinked core and a stabilising mantle containing salt forming groups and (b) 95 to 5% by weight of addition polymer microparticles having polyoxyalkylene stabiliser units derived from $C_{1-4}$ alkoxypolyoxyalkylene containing monomers.

14 Claims, No Drawings

COATINGS

This is a continuation of application Ser. No. 07/652,482 filed on Feb. 8, 1991 which was abandoned upon the filing hereof which is a continuation of application Ser. No. 07/527,700 filed May 22, 1990 now abandoned which is a continuation of application Ser. No. 07/214,404, filed Jul. 1, 1988 now abandoned.

This invention relates to an aqueous coating composition, to a process for its preparation and to its use especially as a basecoat in vehicle refinishing.

Painting vehicles, especially motor vehicles, is typically a three step process. The first step comprises the application of a pre-treatment coating to improve the corrosion resistance of the fabric of the vehicle to be painted and to act as a key for subsequent coatings, an undercoat and a topcoat. The topcoat carries the pigment and gives the final appearance to the vehicle.

Traditionally, topcoats were formulated to provide the colour and the glossy appearance. In recent years, a new system called the basecoat/clearcoat system, has been introduced. In this system a pigment-containing coat is applied to the article. This pigment-containing coating is called the basecoat. Next a coat is applied to provide the glossy appearance. This is called the clearcoat.

EP-A-0038127 discloses and claims an entirely revolutionary basecoat/clearcoat system which is essentially intended for use during the original manufacture of motor vehicles. The system is based on an aqueous basecoat which is pseudoplastic or thixotropic, and this pseudoplastic or thixotropic character allows the composition to be sprayed under varying conditions of ambient humidity. However the basecoats disclosed therein are of a type suitable for use on vehicle manufacturing lines where a heating step (called stoving) to temperatures of 120° C. and above is usual to cure the paint film. Accordingly, the base coat compositions disclosed there would not lend themselves directly to use in a refinish painting system where ambient temperature or low bake (that is heating the coated article at temperatures up to 80° C.) drying or curing are usual practice.

We have now discovered that it is possible to prepare basecoat compositions based on a mixture of microparticles and these basecoats dry at ambient or low bake temperatures. The coating films obtained from these mixtures give satisfactory results in a basecoat/clearcoat system suitable for use by vehicle refinishers.

According to the present invention there is provided a basecoat composition comprising a dispersion in an aqueous carrier for the composition of polymer microparticles, the polymer microparticles being a mixture of:

(a) 5 to 95% by weight of addition polymer microparticles having a crosslinked core and a stabilising mantle containing salt forming groups and (b) 95 to 5% by weight of addition polymer microparticles having $C_{1-4}$ alkoxypolyoxyalkylene stabiliser units derived from $C_{1-4}$ alkoxypolyoxyalkylene containing monomers.

By way of example, component (a) of the mixture that is the addition polymer microparticles having a crosslinked core can be from 85 to 15% by weight of the mixture or 40 to 80% by weight of the mixture.

By way of example, component (b) of the mixture that is the addition polymer microparticles having $C_{1-4}$ alkoxypolyoxyalkylene stabilising units can be from 20 to 60% by weight of the mixture or 70 to 30% by weight of the mixture.

In structure, the addition polymer microparticles making up component (a) of the mixture consists of a crosslinked core from which there extends a stabilising mantle containing salt-forming groups. The crosslinked core in practice consists of a non-crosslinked seed on to which a crosslinked shell is formed. The seed and shell are regarded as the core.

Examples of monomers from which the seed polymer is formed are acrylic and methacrylic acid esters and nitriles, vinyl esters and vinyl benzene derivatives.

Examples of acrylic and methacrylic acid esters are $C_{1-10}$ alkyl esters particularly methyl acrylate, ethyl acrylate, propyl acrylate, butyl acrylate, pentyl acrylate, hexyl acrylate, 2-ethylhexylacrylate, methyl methacrylate, ethyl methacrylate, propyl methacrylate, butyl methacrylate, pentyl methacrylate and hexyl methacrylate.

Examples of nitriles are acrylonitrile and methacrylonitrile.

Examples of vinyl esters are vinyl $C_{1-6}$ alkanoate esters, particularly vinyl acetate, vinyl proprionate, vinyl butyrate, vinyl pentanoate and vinyl hexanoate Examples of vinyl benzene derivatives are styrene and vinyl toluene.

Preferably the polymer seed is an acrylate or methacrylate polymer or co-polymer. In particular it can be polymethyl methacrylate or a co-polymer of methyl methacrylate and butyl acrylate.

The shell formed on the seed polymer is crosslinked. Thus it is made up from structural units and crosslinking units. The structural units from which the shell is formed are derived from those monomers referred to above from which the seed polymer is formed.

Thus the structural units are derived from acrylic and methacrylic acid esters and nitriles, vinyl esters and vinyl benzene derivatives.

The crosslinking units are derived from crosslinking monomers. The crosslinking monomers can be either monomers that are polyfunctional with respect to the polymerisation reaction or a pair of monomers each of which has a complementary group which reacts to form a covalent bond.

Examples of monomers that are polyfunctional with respect to the polymerisation reaction are: ethyleneglycol diacrylate, ethyleneglycol dimethacrylate, propylene glycol diacrylate, allyl acrylate, allyl methacrylate and di-vinyl benzene.

Examples of complementary functional groups which react to form covalent bonds are carboxyl and epoxy groups, anhydride and hydroxy groups and isocyanate and hydroxy groups.

The carboxyl/epoxy group pair can be derived from the following monomers: acrylic acid, methacrylic acid, and glycidyl methacrylate.

The anhydride group/hydroxy group pair can be derived from the following monomers: maleic anhydride and hydroxy $C_{1-6}$ alkyl acrylates and methacrylates particularly 2-hydroxyethylacrylate.

The isocyanate group/hydroxy group pair can be derived from the following monomers: isocyanatoethyl methacrylate, meta-isopropenyl dimethylbenzylisocyanate and hydroxy $C_{1-6}$ alkyl acrylates and methacrylates particularly 2-hydroxyethylacrylate.

Preferably the structural units are derived from acrylate and/or methacrylate monomers. More preferably, the shell has structural units derived from both acrylate and methacrylate monomers. In particular the structural units are derived from methylmethacrylate and butylacrylate.

The precise chemical composition of the crosslinked core and the degree of crosslinking depends in part upon the physical characteristics desired in the polymer itself and in particular the Tg or glass transition temperature.

Referring to the preferred structural and crosslinking units, the shell can contain from 15 to 47 parts by weight of methylmethacrylate, 81 to 49 parts by weight of butyl or 2-ethylhexylacrylate and 2 to 4 parts of allylmethacrylate.

One specific shell is derived from monomers in the following amounts:

| | |
|---|---|
| methylmethacrylate | 16 parts by weight |
| butyl acrylate | 81 parts by weight |
| allyl methacrylate | 3 parts by weight |

The mantle which is formed on the shell contributes wholly or in part to the stability and rheological properties of the microparticles in dispersion. The mantle is made up of salt-forming group-containing units, optionally other hydrophilic group-containing units and structural units.

Examples of salt forming groups are amine groups, which form salts in acid media and carboxyl groups which form salts in neutral or alkaline media.

Examples of monomers from which amine group containing units are derived are mono and di-$C_{1-6}$ alkylamino-$C_{1-6}$ alkyl acrylates and methacrylates in particular t-butylaminoethyl methacrylate and dimethylaminoethyl methacrylate.

Examples of monomers from which carboxyl group containing units are derived are acrylic and methacrylic acids. Preferably the monomer is methacrylic acid.

Examples of monomers containing other hydrophilic groups are hydroxyl group-containing monomers for example hydroxy $C_{2-6}$ alkyl acrylates and methacrylates for example hydroxyethylacrylate.

Examples of monomers from which structural units are derived are those monomers referred to above from which the seed polymer is formed. So the structural units are derived from acrylic and/or methacrylic acid esters.

Typically the mantle contains 10 to 20% of salt-forming units and 80 to 90% of structural units.

Where the mantle contains other hydrophilic units then these units preferably make up from 5 to 35% of the structural units.

The microparticles with stabilising mantle described above are known or can be made by known processes as described for example in EP-A 0038127 and EP-A-0001489.

The addition polymer microparticles having $C_{1-4}$ alkoxypolyoxyalkylene stabiliser units are optionally crosslinked. The microparticles are made up of structural units, polyoxyalkylene group containing units, optionally crosslinking units and optionally also units containing di-$C_{1-6}$ alkylamino, hydroxy or oxirane groups.

Examples of monomers from which the structural units are derived are as described above with reference to the polymer seed forming part of the crosslinked microparticles having a stabilising mantle. Thus the structural units are derived from for example, acrylic and methacrylic acid esters and nitriles, vinyl esters and vinyl benzene derivatives.

Examples of acrylic and methacrylic acid esters and nitriles are $C_{1-10}$ alkyl esters particularly methylacrylate, ethylacrylate, propyl acrylate, butyl acrylate, pentyl acrylate, hexyl acrylate, 2-ethylhexyl acrylate, methyl methacrylate, ethyl methacrylate, propyl methacrylate, butyl methacrylate, pentyl methacrylate and hexyl methacrylate.

Examples of nitriles are acrylonitrile and methacrylonitrile.

Examples of vinyl esters are vinyl $C_{1-6}$ alkanoate esters, particularly vinylacetate, vinyl proprionate vinyl butyrate, vinyl pentanoate and vinyl hexanoate.

Examples of vinyl benzene derivatives are styrene and vinyl toluene.

Preferably the structural units are derived from $C_{1-6}$ alkyl acrylate monomers and vinyl benzene derivative monomers. In particular they are derived from styrene and butyl acrylate.

The exact proportion of monomers in the polymer is chosen so as to obtain the appropriate and desired physical properties in the polymer produced. The monomers are selected primarily so as to control the Tg or glass transition temperature. In particular the monomers are selected such that the Tg is from $-25°$ C. to $+50°$ C. Preferably it is $-10°$ C. to $+10°$ C..

The Tg is calculated using the Fox Equation:

$$\frac{1}{Tg} = \Sigma \frac{\text{wt fraction of monomer}}{Tg \text{ of homopolymer of that monomer}}$$

For the particular monomers referred to, the polymer consists of 30 to 80% of styrene, preferably 40 to 60% and 20 to 70% of butyl acrylate, preferably 40 to 60%.

Preferably the polymer also contains oxirane group-containing units. These units are preferably derived from glycidyl methacrylate monomer.

The glycidyl methacrylate monomers can make up to 5 to 50% by weight of the polymer. Preferably they make up 10 to 30% by weight of the polymer.

The crosslinking units can be derived from the monomers referred to above with reference to component (a) of the microparticle mixture. In particular it is allylmethacrylate.

The stabiliser units are derived from $C_{1-4}$ alkoxypolyoxyalkylene acrylate or methacrylate esters which in practice have a molecular weight in the range 1,000 to 3,000. The $C_{1-4}$ alkoxy moiety can be methoxy, ethoxy or propoxy. Preferably it is methoxy.

The alkylene moiety is predominantly ethylene which may contain a proportion of propylene and/or butylene.

Preferably the stabiliser has a molecular weight of 2,000. In particular the stabiliser is methoxypolyoxyethylene (2,000) methacrylate.

The polymer microparticles having $C_{1-4}$ alkoxypolyoxyalkylene stabiliser units can be made by known methods. For example, they can be made by emulsion polymerisation or by an aqueous dispersion polymerisation process as described in EP-A-0013478.

In addition to the mixture of polymer microparticles, the compositions of this invention can also contain other ingredients that are standard for paint compositions. For example, the compositions can contain a pigment which can be either a solid colour pigment or a metallic flake pigment but is preferably a metallic pigment especially an aluminium flake pigment.

The composition can also contain co-solvents for example 2-butoxyethanol to aid coalescence, dispersants, rheological modifiers particularly Primal ASE-60, and wetting agents to reduce the surface tension of the composition and improve flow. Primal ASE-60 is a Registered Trade Mark. These compositions may also include extenders, and biocides to inhibit bacterial growth over long periods.

The compositions of the invention can be prepared by standard methods for example by mixing the aqueous dispersion of polymer microparticles having a crosslinked core and stabilising mantle with the dispersion of polymer microparticles having $C_{1-4}$ alkoxypolyoxyalkylene stabiliser units.

Other components of the composition, and in particular the components referred to above as standard ingredients for paint compositions can be added to either of the dispersions before the dispersions themselves are mixed or added to the dispersion mixture.

The compositions of this invention can be applied by standard techniques (for example by spraying or brushing) in a basecoat/clearcoat process.

Accordingly, the invention also provides a process for coating an article which comprises applying a basecoat composition according to the invention and thereafter applying a clearcoat.

After the basecoat has been applied to the article, it can be allowed to dry at ambient temperature or can be heated to accelerate drying.

When the basecoat is dry, it is coated with a clearcoat, for example, an isocyanate-acrylic polyol two-pack clearcoat which is allowed to dry at ambient temperature or is cured by baking at low temperatures.

The following Examples illustrate the invention.

EXAMPLES

EXAMPLE 1

1.1 Preparation of an Aqueous Dispersion of Crosslinked Polymer Microparticles with Stabilising Mantle The following Example describes the preparation of an aqueous dispersion of polymer microparticles consisting of a crosslinked core which in turn is surrounded by a non-crosslinked mantle.

(a) Formation of polymer seeds: A mixture of butyl acrylate (0.503 parts) and methyl methacrylate (0.466 parts) was added to a heated (80°-85° C.) surfactant solution comprising the ammonium salt of sulphated alkylphenoxypoly(ethyleneoxy)ethanol (0.215 parts sold as Fenopon CO-436) in demineralised water 40.142 parts). The mixture was held at 80°-85° C. for 5 minutes and a mixture of ammonium persulphate (0.015 parts) in demineralised water (0.501 parts) was added and the reaction mixture was held at 80°-85° C. for 30 minutes. The product so obtained was an aqueous dispersion of polymer seeds having a particle diameter of about 40 nm.

(b) Formation of crosslinked shell: An emulsion was made from methyl methacrylate (7.623 parts), butyl acrylate (8.101 parts), allyl methacrylate (0.517 parts), surfactant solution (0.140 parts) and demineralised water (10.208 parts). A solution of ammonium persulphate (0.029 parts) was made in demineralised water (3.725 parts). The emulsion and the solution were added simultaneously over 3 hours to the mixture produced in Example 1.1 (a) held at 80°-85° C. When the addition was complete, the mixture so produced was held at 80°-85° C. for 1 hour. The product so obtained was an aqueous dispersion of non-crosslinked seeds on to which a crosslinked core had been built. The polymer particles have a particle diameter of about 80 nm.

(c) Formation of non-crosslinked mantle: An emulsion was made from methacrylic acid (0.709 parts) hydroxyethyl acrylate (1.013 parts) butyl acrylate (3.343 parts), surfactant solution (0.088 parts) and demineralised water (6.651 parts). A solution of ammonium persulphate (0.014 parts) and sodium tetraborate (0.012 parts) was made in demineralised water (1.5 parts).

The emulsion and solution were added simultaneously over 1 hour to the dispersion prepared as described in Example 1.1 (b) held at 80°-85° C. When the addition was completed the mixture was heated at a temperature of 80°-85° C. for a further 1 hour. The product obtained was an aqueous dispersion of polymer particles having a non-crosslinked seed surrounded by a crosslinked shell which in turn is surrounded by a non-crosslinked mantle. The particles have a diameter of about 100 nm.

(d) Neutralisation of microparticle dispersion: A mixture of dimethylaminoethanol (0.435 parts), demineralised water (5.563 parts) and 2-butoxyethanol (7.50 parts) was added over 40 minutes to a pre-heated (90°-95° C.) aqueous dispersion prepared as described in Example 1.1(c). The amount of dimethylaminoethanol added was calculated so as to produce a pH of 7.0. Heating was continued for 2 hours. The dispersion was allowed to cool. A biocide solution made up from aqueous formaldehyde solution (33%; 0.737 parts) and demineralised water (0.25 parts) was added to the cool dispersion to prevent bacterial growth in the final product.

The product obtained is a stable aqueous dispersion of polymer microparticles having a solids content of 22% and a Tg of −5° C.

1.2 Preparation of an Aqueous Dispersion of Polymer Microparticles having Alkoxypolyoxyalkylene Stabiliser Units (a) Formation of Polymer Seeds Styrene (1.670 parts), butyl acrylate (2.050 parts) and 2,2-azobis(2-methylbutyronitrile) (0.090 parts) were added in one shot to a refluxing mixture of demineralised water (22.11 parts), ethanol (29.63 parts) and methoxypolyethyleneglycol acrylate (average molecular weight 2000; 30% solution 5.57 parts). The mixture was heated under reflux for 30 minutes to produce a dispersion of non crosslinked polymer seeds.

(b) Formation of Shell A mixture of styrene (9.310 parts), butyl acrylate (11.36 parts), glycidyl methacrylate (6.10 parts), methoxypolyethyleneglycol acrylate (average molecular weight, 2000; 30% solution; 4.56 parts) and 2,2-azobis(2-methylbutyronitrile) (0.57 parts) were added dropwise over 3 hours to the seed dispersion heated under reflux and prepared as described in Example 1.2(a) above. The product so obtained consisted of a non-crosslinked shell formed on the non-crosslinked seeds.

(c) The shell was extended by adding dropwise over 1 hour a mixture of styrene (2.41 parts), butyl acrylate (2.94 parts), glycidyl methacrylate (1.34 parts) and 2,2-azobis(2-methylbutyronitrile)(0.11 parts) to a dispersion prepared as described in Example 1.2(b) whilst heating under reflux. Heating under reflux was continued for a further 30 minutes.

(d) To ensure complete reaction, two further portions of t-butylperoxy-2-ethyl hexanoate (0.090 parts) were added to the refluxing mixture at 30 minute intervals and heating under reflux was continued for 30 minutes after each addition. The mixture was cooled and the ethanol was removed by azeotropic evaporation at 40° C. and at reduced pressure to yield an aqueous microparticle dispersion having a 50% solids content. The polymer has a Tg of approximately 3° C.

1.3 Preparation of Aluminium Inhibitor

A solution of alkylarylphosphate ester (sold under the Trade Mark Lubrizol 2062; 53.82 parts) was made in butoxyethanol (43.12 parts) and neutralised to pH 7.6 with triethylamine (3.06 parts).

1.4 Preparation of Thickener

A solution of an acrylic emulsion thickener (sold under the Trade Mark Primal ASE 60; 7.14 parts) was made in demineralised water (92.01 parts) and adjusted with triethylamine (0.85 parts) to pH 7.3.

1.5 Preparation of Aluminium Flake Slurry

Aluminium paste having a 65% metal content in a hydrocarbon carrier (sold under the Trade Mark Stapa R507; 4.92 parts) was mixed with butoxyethanol (7.08 parts) and aluminium inhibitor solution prepared as described in Example 1.3 above (1.51 parts). Stirring was continued for 30 minutes to ensure complete mixing.

1.6 Preparation of Basecoat Composition

A basecoat composition was prepared as follows. A portion of the crosslinked microparticle dispersion prepared as described in Example 1.1 (29.09 parts), a portion of non-crosslinked microparticle dispersion prepared as described in Example 1.2 (12.80 parts), aluminium flake slurry prepared as described in Example 1.5 (13.51 parts) and thickener prepared as described in Example 1.4 (15.00 parts) were mixed and adjusted to pH 7.6 with aqueous dimethylaminoethanol solution (10%; 0.29 parts).

The amounts of the non-crosslinked and crosslinked microparticle dispersions above give a 50:50 ratio of crosslinked to non-crosslinked microparticles in the final basecoat.

The mixture so obtained was diluted with demineralised water (17.81 parts) and the diluted mixture mixed with further portions of thickener (11.50 parts).

EXAMPLES 2 TO 8

Basecoat compositions were made using the method of Example 1.6 using the microparticle dispersions in amounts so as to give the ratio of microparticles with stabilising mantle (A) to microparticles having alkoxypolyoxyalkylene stabiliser units (B) shown in Table 1.

TABLE 1

| Example No. | Parts A | Parts B |
|---|---|---|
| 1 | 50 | 50 |
| 2 | 100 | 0 |
| 3 | 95 | 5 |
| 4 | 85 | 15 |
| 5 | 70 | 30 |
| 6 | 30 | 70 |
| 7 | 15 | 85 |
| 8 | 5 | 95 |

1.7 Relative Performance Tests

The basecoat compositions of Examples 1 to 8 were tested for their ability to maintain distinction of a reflected image (DOI) and to resist blistering when exposed to water vapour at 60° C. for 6, 24 and 48 hours respectively after having been sprayed on to metal panels as part of a basecoat/clearcoat system.

Test panels were made up as follows. Test panels were coated with ICI Autocolor Long Life Etching Primer P565-597 activated with ICI Autocolor Activator P275-61 and then sprayed with a two pack polyurethane undercoat sold under the Trade Mark ICI Autocolour Hi-Dur P565-693 mixed with ICI Autocolor 2K hardener P210-770. The panels were coated by spraying with basecoats prepared as described in Examples 1 to 8 and allowed to dry at ambient temperature. The panels coated with basecoat were then coated by spraying with a two pack polyurethane clearcoat sold under the Trade Mark ICI Autocolor 2K clearcoat mixed with ICI Autocolor 2K hardener P210-770. The panels were then stoved at 70° C. for 20 minutes.

The tests were carried out by exposing the panels on a Cleveland Cabinet (manufactured by the Q-Panel Company) which exposed the panels to water vapour at 60° C. and 100% humidity.

The extent of blistering was assessed using British Standard AU148; Part II, 1969. The maintenance of distinction of reflected image was assessed using a Ford Image Clarity Meter described in Ford Laboratory Test Method EU-B1 10-1. The results are set out in Table 2 below. Also shown in Table 2 is the result of testing a composition from example 26 for comparison.

For the blistering results (BL) in Table 2, 10 means no blistering and 2 means large blisters; D means dense blistering, MD means medium dense blistering, F means few blisters, Mic VF means very few microscopic blisters.

For the distinction of reflected image results (DOI) 10 means maximum distinction of image and 0 means no distinction of image.

TABLE 2

| B/C Example No. | B/C Film Thickness (μm) | Init. DOI | 6 Hrs BL | 6 Hrs DOI | 24 Hrs BL | 24 Hrs DOI | 48 Hrs BL | 48 Hrs DOI | Rec DOI |
|---|---|---|---|---|---|---|---|---|---|
| 1 | 50 | 10 | 10 | 10 | 10 | 7 | 10 | 4 | 7 |
| " | 20 | 10 | 10 | 10 | 10 | 7 | 10 | 6 | 7 |
| 2 | 45 | 10 | 8D | 3 | 6D | 2 | 3MD | 4 | 6 |
| " | 25 | 10 | 10 | 8 | 10 | 7 | 10 | 7 | 10 |
| 3 | 35 | 10 | 10 | 8 | 6F | 1 | 6F | 1 | 4 |
| " | 20 | 10 | 10 | 10 | 10 | 7 | 10 | 6 | 9 |
| 4 | 35 | 9 | 10 | 7 | 8D | 3 | 8MD | 0 | 5 |
| " | 15 | 10 | 10 | 9 | 10 | 7 | 10 | 5 | 7 |
| 5 | 40 | 6 | 10 | 5 | 10 | 4 | 10 | 2 | 3 |
| " | 20 | 8 | 10 | 8 | 10 | 7 | 10 | 7 | 7 |

TABLE 2-continued

| B/C Example No. | B/C Film Thickness (μm) | Init. DOI | Hours of Exposure | | | | | | Rec DOI |
|---|---|---|---|---|---|---|---|---|---|
| | | | 6 Hrs | | 24 Hrs | | 48 Hrs | | |
| | | | BL | DOI | BL | DOI | BL | DOI | |
| 6 | 55 | 9 | 10 | 9 | 10 | 6 | MicVF | 7 | 6 |
| " | 20 | 9 | 10 | 10 | 10 | 8 | MicVF | 8 | 6 |
| 7 | 40 | 3* | 10 | 4 | 10 | 3 | 10 | 4 | 3 |
| " | 17 | 3* | 10 | 5 | 10 | 3 | 10 | 4 | 1 |
| 8 | 30 | 8 | 6F | 6 | 6F | 6 | 6F | 5 | 5 |
| " | 17 | 9 | 10 | 6 | 10 | 6 | 10 | 5 | 5 |
| 26 | 15 | 8 | | | 9F | 2 | 9F | 3 | 3 |

*Clearcoat sinkage into the basecoat.

EXAMPLE 9

9.1 Preparation of aqueous dispersion of crosslinked microparticles with stabilising mantle (a) Formation of polymer seeds: A seed dispersion was prepared by the method of Example 1.1(a) using the following ingredients;

| 1. | Demineralised water | (44.788 parts) |
| | Ammonium salt of a sulphated alkyl phenoxy poly(ethyleneoxy) ethanol | (0.181 parts) |
| 2. | Butyl acrylate | (0.424 parts) |
| | Methyl methacrylate | (0.392 parts) |
| 3. | Demineralised water | (0.422 parts) |
| | Ammonium persulphate | (0.013 parts) |

(b) Formation of shell: A seed and core dispersion was prepared using the method of Example 1.1(b) using the following ingredients:

| 4. | Methyl methacrylate | (6.416) |
| | Allyl methacrylate | (0.435) |
| | Butyl acrylate | (6.819) |
| | Ammonium salt of a sulphated alkyl phenoxy poly(ethyleneoxy) ethanol | (0.118) |
| | Demineralised water | (8.592) |
| 5. | Demineralised water | (3.135) |
| | Ammonium persulphate | (0.024) |

(c) Formation of mantle: The mantle was attached to the seed/shell polymer particles as described in Example 1.1(c) using the following ingredients:

| 6. | Methacrylic acid | (0.597) |
| | Hydroxy ethyl acrylate | (0.853) |
| | Butyl acrylate | (2.814) |
| | Ammonium salt of a sulphated alkyl phenoxy poly(ethyleneoxy)ethanol | (0.074) |
| | Demineralised water | (4.756) |
| 7. | Demineralised water | (0.375) |
| | Ammonium persulphate | (0.012) |
| | Sodium tetraborate | (0.010) |

(d) Neutralisation of microparticle dispersion: The microparticle dispersion prepared as described in Example 9.1 (a) to (c) was neutralised by addition of an aqueous solution of triethylamine (0.45 parts) in demineralised water (3.0 parts). The amount of triethylamine was calculated to achieve pH7 in the neutralised dispersion. The neutralised dispersion was diluted by the addition over 20 min. of a mixture of 2-butoxyethanol (10.85 parts) and demineralised water (2.00 parts). Following this dilution, a biocide solution made up of formaldehyde solution (33%; 0.620 parts) and demineralised water (1.83 parts) was added to the dispersion.

The product so obtained was a stable aqueous dispersion of polymer microparticles having a solids content of 18% and a Tg of −5° C.

9.2 Preparation of Aqueous Dispersion of Polymer Microparticles having Alkoxypolyoxyalkylene Stabiliser Units Aqueous dispersions of polymer microparticles having alkoxypolyoxyalkylene stabiliser units were prepared as described in Example 1.2 (except that the ethanol was not removed by azeotropic evaporation, so had a solids of 40%) using methyl methacrylate and butyl acrylate in amounts so as to give a final polymer having a methyl methacrylate to butyl acrylate ratio of 29:71 and a glass transition temperature of −25° C.

EXAMPLES 10 TO 19

10.1 to 19.1. In Examples 10 to 19 the crosslinked polymer microparticles with stabilising mantle used were those as described in Example 9.1

10.2 to 19.2. Aqueous dispersions of polymer microparticles having alkoxypolyoxyalkylene stabiliser units were prepared as described in Example 9.2 using amounts of monomers so as to give a final polymer having the proportions of monomers and glass transition temperatures given in Table 3 below.

In Table 3, the abbreviations have the following meanings:
AMA=allyl methacrylate
BA=butyl acrylate
GMA=glycidyl methacrylate
HBA=hydroxybutyl acrylate
HEA=hydroxyethyl acrylate
MMA=methyl methacrylate
ST=styrene

TABLE 3

| Example No. | Monomers Ratio in final polymer | | | Tg °C. |
|---|---|---|---|---|
| | 1 | 2 | 3 | |
| 9.2 | MMA | BA | | |
| | 29 | 71 | | −25° |
| 10.2 | MMA | BA | | |
| | 48 | 52 | | 0° |
| 11.2 | MMA | BA | | |
| | 64 | 36 | | 25° |
| 12.2 | MMA | BA | | |
| | 77 | 23 | | 50° |
| 13.2 | ST | BA | | |
| | 50 | 50 | | 1.5° |
| 14.2 | MMA | BA | DMAEMA | |
| | 49 | 49 | 2 | 3° |
| 15.2 | MMA | BA | HEA | |
| | 44 | 46 | 10 | 0° |
| 16.2 | MMA | BA | HBA | |
| | 47 | 43 | 10 | 0° C. |
| 17.2 | MMA | BA | GMA | |
| | 35 | 45 | 20 | 3° C. |
| 18.2 | MMA | BA | AMA | |

TABLE 3-continued

| Example No. | Monomers Ratio in final polymer | | | Tg °C. |
|---|---|---|---|---|
| | 1 | 2 | 3 | |
| 19.2 | 49 ST 36 | 49 BA 44 | 2 GMA 20 | 3° |

9.3 to 19.3 Preparation of Basecoat Compositions

Crosslinked microparticle dispersions prepared as described in Example 9.1 (53.52 parts) and polyoxyalkylene stabilised non-crosslinked microparticle dispersion prepared as described in Example 9.2 to 19.2 respectively (10.29 parts) were added with stirring to an aluminium flake/inhibitor mixture. The aluminium flake/inhibitor mixture was prepared by mixing aluminium paste (65% metal in a hydrocarbon carrier sold under the Trade Mark Silberline 5000 AR; 3.44 parts) with inhibitor solution prepared as described in Example 1.3 (1.5 parts) and butoxyethanol (3.99 parts) with stirring for 30 min.

The mixture so obtained in each case was neutralised to pH 7.6 with aqueous dimethylamino ethanol solution (10%; 0.60 parts) and demineralised water (6.94 parts). The rheology was adjusted by addition of thickener solution (20.82 parts) prepared as described in Example 1.4.

9.4 to 19.4 Relative Performance Tests

The basecoat compositions from examples 9.3 to 19.3 were tested in a basecoat/clearcoat paint system for their ability to maintain distinction of reflected image and to resist blistering when immersed in demineralised water at 38° C. for 48 and 72 hours.

Test panels were prepared as follows. Panels which had been prepared in a basecoat and thermosetting acrylic clearcoat system used in the automotive industry were wet flatted with P800 wet or dry paper. The panels were then coated by spraying with basecoats prepared as described in Examples 9.3 to 19.3 and allowed to dry at ambient temperature. The panels coated with basecoat were then coated by spraying with a two-pack polyurethane clearcoat sold under the Trade Mark ICI Autocolor 2K clearcoat P190-435 mixed with ICI Autocolor 2K Hardener P210-770. The panels were then stoved at 70° C. for 20 minutes.

The test carried out on the panels consists of immersion in demineralised water at 38° C. and blister assessment, both of which are described in BS AU 148: Part II: 1969. The maintenance of distinction of reflected image was assessed using a Ford Image Clarity Meter described in Ford Laboratory Test Method EU-Bl10-1. The results are set out in Table 4 below.

For the blistering results (BL) in Table 4,
10 = no blistering
2 = large blisters
D = dense blisters
MD = medium-dense blisters
M = medium blisters
MF = medium to few blisters
F = few blisters
VF = very few blisters
Mic = microscopic blisters.

For the distinction of image (DOI) results in Table 4
10 = maximum DOI
0 = No DOI The recovery DOI (abbreviated to Rec. DOI) is that which is measured 24 hours after removal from the test.

Basecoat is abbreviated to B/C. Initial DOI is abbreviated to init. DOI.

TABLE 4

| B/C Example | B/C film Thickness (μm) | Init. DOI | Hours of Exposure | | | | Rec. DOI |
|---|---|---|---|---|---|---|---|
| | | | 48 Hours | | 72 Hours | | |
| | | | BL | DOI | BL | DOI | |
| 9.3 | 27 | 9 | 9vF | — | 9D | 0 | 0 |
| | 16 | 8 | Mic M | — | Mic M | 0 | 3 |
| 10.3 | 37 | 6 | Mic M | 2 | Mic M | 1 | 5 |
| | 18 | 6 | Mic M | 2 | Mic F | 4 | 4 |
| 11.3 | 30 | — | 9F | — | 9D | 0 | 0 |
| | 22 | — | Mic M | — | Mic M | 2 | 6 |
| 12.3 | 26 | 8 | 9F | | 9MD | 0 | 0 |
| | 15 | 9 | Mic FM | — | Mic M | 2 | 5 |
| 13.3 | 31 | 8 | Mic MD | 0 | 9F | 0 | 0 |
| | 17 | 8 | Mic MD | 4 | Mic MD | 5 | 8 |
| 14.3 | 30 | 8 | 9F | — | 7M | 0 | 1 |
| | 16 | 9 | Mic M | — | Mic M | 2 | 5 |
| 15.3 | 33 | 8 | 9M | — | 7M | 0 | 1 |
| | 20 | 8 | Mic M | — | Mic M | 1 | 4 |
| 16.3 | 32 | 9 | Mic M | — | 9D | 0 | 0 |
| | 18 | 10 | Mic M | — | Mic M | 3 | 4 |
| 17.3 | 40 | 8 | Mic M | 4 | Mic M | 1 | 1 |
| | 23 | 8 | Mic M | 6 | Mic M | 4 | 8 |
| 18.3 | 44 | 8 | 9F/Mic M | 4 | 6F/MicM | 2 | 7 |
| | 20 | 8 | Mic M | 5 | 9F/MicM | 5 | 7 |
| 19.3 | 24 | 5 | 10 | 0 | 10 | 0 | 5 |
| | 15 | 7 | 10 | 1 | 10 | 2 | 5 |

EXAMPLE 20

20.1 Preparation of crosslinked microparticle dispersion (a) Formation of polymer seeds: A mixture of methyl methacrylate (5.531 parts) azodiisobutyronitrile (0.428 parts) and comb stabiliser prepared as described in Example 20.1 (d) below (2.023 parts) was added to heptane (36.123 parts) being heated under reflux and the heating under reflux was continued for 30 minutes to produce a dispersion of polymethyl methacrylate seed particles.

(b) Formation of crosslinked shell: A mixture of methyl methacrylate (25.489 parts) allyl methacrylate (0.790 parts) azodiisobutyronitrile (0.345 parts) and comb stabiliser prepared as described in Example 20.1 (d) below (5.492 parts) was added over 3 hrs. to the dispersion prepared as described in Example 20.1 (a) above while the dispersion was being heated under reflux. When the addition was completed, the mixture was diluted with a further portion of heptane (6.387 parts) and the heating under reflux was continued for a further 1 hour to produce a dispersion of crosslinked polymer microparticles.

(c) Formation of non-crosslinked mantle: A mixture of methyl methacrylate (3.368 parts) hydroxyethyl acrylate (1.773 parts), acrylic acid (1.064) butyl acrylate (2.659 parts), comb stabiliser prepared as described in Example 20.1(d) below (2.079 parts) and azodiisobutyronitrile (0.062 parts) was added over 1 hour to the dispersion prepared as described in Example 20.1(b). The mixture so obtained was diluted with heptane (6.387 parts) and the diluted mixture heated under reflux for 1 hr. The mixture was then cooled and consists of a dispersion of polymer microparticles having a core and mantle, the mantle capable of stabilising the particles in aqueous media.

(d) Preparation of Comb Stabiliser

The comb stabiliser used in the above procedure was obtained as follows. 12-Hydroxystearic acid was self-condensed to an acid value of about 31-34 mg KOH/g (corresponding to a molecular weight of 1650-1800) and then reacted with an equivalent amount of glycidyl methacrylate. The resulting unsaturated ester was copolymerised at a weight ratio of 2:1 with a mixture of methyl methacrylate and acrylic acid in the proportions of 95:5. The copolymer was used as a 33% solution in a mixture of ethyl acetate 11.60%, toluene 14.44%, aliphatic hydrocarbon b.p. 98°-112° C. 61.29% and aliphatic hydrocarbon b.p. 138°-165° C. 12.67%.

(e) Preparation of aqueous dispersion:

A portion (38.529 parts) of polymer dispersion produced as described in Example 20.1 (c) was added to a pre-heated (90° C.) mixture of demineralised water (53.209 parts) 2-butyoxyethanol (7.880 parts) and dimethylamino ethanol (0.362 parts). During the addition process, the heptane diluent evaporates and is collected. Heating of the aqueous medium is continued until the temperature rises to 98° C. indicating complete removal of heptane. The product so obtained is an aqueous dispersion of polymer microparticles having a solids content of 22%.

20.2 Preparation of Polymer Microparticles having Alkoxypolyoxyalkylene Stabiliser Units The microparticle dispersion was prepared as described in Example 1.2.

20.3 Preparation of Aluminium Flake Slurry

An aluminium flake dispersion was made up by thoroughly mixing for 30 minutes, aluminium paste (65% metal in a hydrocarbon carrier and sold under the Trade Mark Stapa R507; 4.03 parts), inhibitor solution prepared as described in Example 1.3 (1.57 parts) and 2-butoxyethanol (6.79 parts).

20.4 Preparation of Basecoat Composition

The aluminium flake dispersion from 20.3 (12.39 parts) was mixed with a portion of microparticle dispersion prepared as described in Example 20.1 above (36.22 parts) and water-soluble melamine formaldehyde resin (0.57 parts; sold under the Trade Mark Beetle BE370) the mixture was adjusted with dimethylaminoethanol solution (10%, 1.00 parts) and demineralised water (19.08 parts) to pH 7.6. The neutralised solution so obtained was mixed with thickener (25.00 parts) prepared as described in Example 1.4 above and a polymer microparticle dispersion prepared as described in Example 20.2 above (5.74 parts).

20.5 Relative Performance Tests

Panels were prepared and tested as in examples 9.4 to 19.4. For comparison, a basecoat was prepared according to European Patent EP38127 example 4b. The results of the tests are shown in Table 5. In Table 5 the blister results (BL) and the distinction of image results (DOI) are abbreviated as in Table 4.

TABLE 5

| B/C Ref. | B/C Film Thickness (μm) | Init. DOI | 48 Hrs DOI | 48 Hrs BL | 72 Hrs DOI | 72 Hrs BL | Rec DOI |
|---|---|---|---|---|---|---|---|
| 20.3 | 12 | 7 | MicD | 4 | 9VF | 4 | 6 |
| EP38127 ex.4b | 15 | 8 | MicD | 0 | MicD | 0 | 0 |

EXAMPLE 21

21.1 Preparation of aqueous dispersion of crosslinked polymer Microparticles with stabilising mantle Microparticles were prepared by the process described in Example 9.1 using the following ingredients.

| (a) Formation of seed: | | |
|---|---|---|
| 1. Initial charge: | demineralised water | 40.142 parts |
| Surfactant soln: | Ammonium salt of a sulphated alkyl phenoxy poly(ethyleneoxy) ethanol | 0.215 parts |
| 2. Seed monomers: | methyl methacrylate | 0.466 parts |
|  | butyl acrylate | 0.503 parts |
| 3. Initiator: | demineralised water | 0.501 parts |
|  | ammonium persulphate | 0.015 parts |
| (b) Formation of shell: | | |
| 4. Shell | methyl methacrylate | 2.297 parts |
|  | allyl methacrylate | 0.492 parts |
|  | butyl acrylate | 13.452 parts |
|  | surfactant solution (as 21.1 (a)) | 0.140 parts |
|  | demineralised water | 10.208 parts |
| 5. Initiator | demineralised water | 3.725 parts |
|  | ammonium persulphate | 0.029 parts |
| (c) Formation of mantle: | | |
| 6. Mantle | methyacrylic acid | 0.709 parts |
|  | hydroxyethyl acrylate | 1.013 parts |
|  | butyl acrylate | 3.343 parts |
|  | surfactant solution (as 21.1 (a)) | 0.088 parts |
|  | demineralised water | 6.151 parts |
| 7. Initiator | demineralised water | 1.500 parts |
|  | ammonium persulphate | 0.014 parts |
|  | sodium tetraborate | 0.012 parts |
| (d) Neutralisation of microparticle dispersion: | | |
| Amine solution: | demineralised water | 3.073 parts |
|  | dimethylamino ethanol | 0.425 parts |
| Co-solvent solution: | demineralized water | 3.00 parts |
|  | 2-butoxyethanol | 7.5 parts |
| Biocide solution: | formaldehyde solution | 0.737 parts |
|  | demineralised water | 0.25 parts |

21.2 Preparation of Aqueous Dispersion of Polymer Microparticles having Alkoxypolyoxyalkylene Stabiliser Units The microparticle dispersion was prepared as described in Example 1.2 above.

21.3 Preparation of Aluminium Flake Slurry

An aluminium flake dispersion was made up by mixing thoroughly for 30 min., aluminium paste (65% metal in a hydrocarbon carrier and sold under the Trade Mark Stapa R507; 4.03 parts), inhibitor solution prepared as described in Example 1.3 (1.57 parts) and 2-butoxyethanol (6.79 parts).

21.4 Preparation of Basecoat Composition

The aluminium flake dispersion from 21.3 (12.39 parts) was mixed with a portion of the microparticle dispersion prepared as described in Example 21.1 above (36.22 parts) and water soluble melamine formaldehyde resin (0.57 parts; sold under the Trade Mark Beetle BE 370). The mixture was adjusted with dimethylaminoethanol solution (10%, 1.00 parts) and demineralised water (19.08 parts) to pH 7.6. The neutralised solution so obtained was mixed with thickener (25.00 parts) prepared as described in Example 1.4 above and polymer microparticle dispersion prepared as described in Example 21.2 above (5.74 parts).

EXAMPLE 22

22.1 Preparation of Aqueous Dispersion of Crosslinked Polymer Microparticles with Stabilising Mantle An aqueous dispersion of crosslinked polymer microparticles with a stabilising mantle was prepared as described in Example 1.1.

22.2 Preparation of Aqueous Dispersion of Polymer Microparticles having Alkoxypolyoxyalkylene Stabiliser Units An aqueous dispersion of non crosslinked microparticles stabilised with alkoxypolyoxyalkylene units were prepared as described in Example 1.2 above.

22.3 Preparation of Aluminium Inhibitor

The inhibitor solution was made as described in European Patent Application. No. 170, 474 Example 1a as follows. A mixture of epoxy resin ("Epikote" 828; 42.03 parts, 0.5 mole) and phenyl glycidyl ether (33.18 parts, 1 mole) was added with stirring over a period of about 1 hour to 88% orthophosphoric acid (24.63 parts, 1 mole) containing triethylamine (0.16 parts). The temperature was allowed to rise as a result of the exotherm, a maximum of about 120° C. being attained. When the addition was complete, the reaction mixture was heated with stirring at 110°-120° C. for 2 hours to ensure complete reaction. The product was a brown, viscous liquid of acid value 124.1 mg KOH/g (non-volatile) which on cooling to room temperature became a very hard solid. To facilitate its handling, the material was diluted and neutralised as follows.

The molten reaction product (17.00 parts) was added with stirring to 2-butoxyethanol (41.72 parts), followed by triethylamine (3.46 parts) and demineralised water (36.31 parts). The pH of the resulting solution was measured and further small additions of triethylamine and demineralised water were made to bring the pH to 7.6.

22.4 Preparation of Aluminium Flake Slurry

Aluminium flake paste sold under the Trade Mark Stapa R507; 65% metal flake in a hydrocarbon carrier, (4.92 parts) 2-butoxyethanol (7.59 parts) and inhibitor solution prepared as described in Example 22.3 (3.30 parts) were mixed together and the mixture was stirred for 30 min.

22.5 Preparation of Metallic Basecoat Composition

A portion (17.45 parts) of microparticle dispersion described in Example 22.1 was mixed with a portion (17.92 parts) of microparticle dispersion prepared as described in Example 22.2. The mixture so obtained was then mixed with thickener prepared as described in Example 1.4 (15.00 parts) and aluminium flake slurry prepared as described in Example 22.4 (15.81 parts) above. This aluminium flake containing mixture was neutralised to pH 7.6 with dimethylamine ethanol solution (10% wt. vol; 0.01 parts) and demineralised water (15.23 parts). The neutralised solution so obtained was mixed with a further portion of thickener (18.58 parts).

22.6 Relative Performance tests

The basecoat (B/C) composition was tested as in example 1.7. For comparison, the basecoat (B/C) from example 5 was also tested in this way. The results are shown in Table 6. In Table 6 the results for blistering (BL) and distinction of image (DOI) are abbreviated as in Table 4.

TABLE 6

| B/C Ref. | B/C Film Thickness μm | Initial DOI | Humidity Resistance | | | | | | Recovery DOI |
|---|---|---|---|---|---|---|---|---|---|
| | | | 6 Hrs | | 24 Hrs | | 48 Hrs | | |
| | | | BL | DOI | BL | DOI | BL | DOI | |
| 5 | 55 | 9 | 10 | 9 | 10 | 6 | Mic VF | 7 | 6 |
| | 20 | 9 | 10 | 10 | 10 | 8 | Mic VF | 8 | 6 |
| 22.4 | 45 | 7 | 10 | 6 | 10 | 6 | 8VF | 6 | 6 |
| | 20 | 8 | 10 | 7 | 10 | 6 | 10 | 6 | 6 |

EXAMPLE 23

23.1 Preparation of an Aqueous Dispersion of Cross linked Polymer Microparticles with Stabilising Mantle An aqueous dispersion of crosslinked polymer microparticles was prepared as described in Example 21.1 above.

23.2 Preparation of an Aqueous Dispersion of Polymer Microparticles having Alkoxypolyoxyalkylene Stabiliser Units An aqueous dispersion of non crosslinked polymer microparticles were prepared as described in Example 1.2 above.

23.3 Preparation of millbase: A portion (23.48 parts) of microparticle dispersion prepared as described in Example 23.1 above was mixed with water soluble melamine-formaldehyde (sold under the Trade Mark Beetle BE 370; (0.77 parts) titanium dioxide pigment (Runa 472 19.45 parts), anti-foam agent (0.19 parts) and wetting agent (0.24 parts). The mixture was dispersed to a particle size of less than 5 microns in a ball-mill. The dispersion so obtained was mixed with a further portion (4.60 parts) of microparticle dispersion prepared as described in Example 23.1 above and demineralised water (1.67 parts).

23.4 Preparation of Basecoat Composition: A portion (50.40 parts) of mill base prepared as described in Example 23.3 above was mixed with a portion (23.76 parts) of microparticle dispersion prepared as described in Example 23.1. The mixture so obtained was diluted with butoxyethanol (5.77 parts) demineralised water (12.30 parts) and non-crosslinked microparticle dispersion prepared as described in Example 23.2 above (7.77 parts).

23.5 Relative Performance Tests

Panels were prepared and tested as in examples 9.4 to 19.4 and compared to a white waterborne basecoat formulated for the original automotive paint market, 'Aquabase' (a registered trade mark of ICI) tested in the same way. The results of the tests are shown in Table 7. In table 7 the results for distinction of image (DOI) and blistering (BL) are abbreviated as in Table 4.

TABLE 7

| B/C Ref. | B/C film Thickness (μm) | Init. DOI | Hours of Exposure | | | | | | Rec. |
| --- | --- | --- | --- | --- | --- | --- | --- | --- | --- |
| | | | 6 Hrs | | 24 Hrs | | 48 Hrs | | |
| | | | BL | DOI | BL | DOI | BL | DOI | |
| 23 | 40 | 10 | BF | 9 | 9VF | 4 | 8F | 6 | 9 |
| | 20 | 10 | Mic F | 10 | 9VF | 3 | 8F | 7 | 8 |
| 'Aquabase' | 40 | 10 | 3/4M | 9 | 4MD | 9 2M | 10 | 10 | |
| White | 25 | 10 | Mic F | 3 | 8F | 4 | 6F | 5 | 5 |

EXAMPLE 24.

24.1 Preparation of Aqueous Dispersion of Crosslinked Polymer Microparticles with Stabilising Mantle a) Formation of polymer seeds: methyl methacrylate (0.383 parts) and butyl acrylate (1.536 parts) were added to a pre-heated 40° C. solution of a condensate of nonyl phenol and 20 moles of ethylene oxide (0.240 parts) in demineralised water (23.827 parts) in a nitrogen atmosphere with stirring.

The mixture was maintained at 40° C. for 15 minutes and two initiator solns. made up, one of ascorbic acid (0.005 parts) in demineralised water (0.499 parts) and one of 20 vol. hydrogen peroxide (0.048 parts) in demineralised water (0.499 parts). These were added to the reaction mixture as concurrent shots. The reaction mixture was maintained at 40° C. for 45 minutes after the addition of the initiator and produced an aqueous dispersion of non-crosslinked polymer seeds.

b) Formation of crosslinked core: A monomer emulsion made up of methyl methacrylate (2.937 parts), allyl methacrylate (0.518 parts), butyl acrylate (13.822 parts), nonyl phenol/polyethylene oxide condensate (1.080 parts), methoxy polyethylene glycol2000 Methacrylate (1.296 parts) demineralised water (14.978 parts) was added over 3 hours to the aqueous dispersion prepared as described in example 24.1(a) above simultaneously with two initiator solutions, one comprising ascorbic acid (0.043 parts) in demineralised water (2.208 parts) and the other 20 vol. Hydrogen peroxide (0.432 parts) in demineralised water (2.208 parts). After this addition, the mixture so produced was held at 55° C. for 1 hour.

The product so obtained was an aqueous dispersion of non-crosslinked seeds on to which a crosslinked core had been built.

c) Formation of Non-crosslinked Mantle: An emulsion made from methacrylic acid (0.808 parts), butyl acrylate (4.308 parts), butyl methacrylate (0.652 parts), nonyl phenol/polyethylene oxide condensate (0.361 parts), methoxy polyethylene glycol2000 methacrylate (0.432 parts) in demineralised water (9.553 parts) was added to the dispersion prepared as described in example 24 (b) at 55° C. simultaneously over 1 hour with two initiator solutions, one comprising ascorbic acid (0.014 parts) in demineralised water (0.883 parts) and the other 20 vol hydrogen peroxide (0.144 parts) in demineralised water (0.883 parts).

When the addition was completed, the mixture was heated at a temp. of 55° C. for a further 1 hour. The product obtained was an aqueous dispersion of polymer particles having a non-crosslinked seed surrounded by a crosslinked core which in turn is surrounded by a non-crosslinked mantle.

d) Neutralisation of microparticle dispersion: A mixture of dimethylamino ethanol (0.427 parts), demineralised water (7.478 parts) and 2-butoxyethanol (7.500 parts) was added over 45 minutes to a pre-heated (55° C.) aqueous dispersion prepared as described is example 24(c). The amount of dimethylaminoethanol added was calculated so as to produce a pH of 7.5–7.7. Heating was continued for 2 hours. The dispersion was allowed to cool.

The product obtained is a stable aqueous dispersion of polymer microparticles having a solids content of 28% and a Tg of −30° C.

24.2 Preparation of Basecoat compositions

A portion of the crosslinked micro-particle dispersion prepared as described in example 24.1 (29.47 parts), a portion of non-crosslinked polyoxyethylene stabilised microparticle dispersion prepared as described is example 1.2 (6.77 parts), aluminium flake slurry prepared as described in example 1.5 (13.09 parts) were mixed and adjusted to pH 7.6 with aqueous dimethylamino-ethanol solution (10%; 0.51 parts). The mixture was diluted with demineralised water (28.68 parts) and the diluted mixture mixed with thickener prepared as described in example 1.4 (21.48 parts).

EXAMPLE 25

Preparation of Basecoat composition

This basecoat was prepared as in 24.2 above but using an aluminium flake paste sold under the Trade Mark Silberline 5000 AR; 65% metal flake in a hydrocarbon carrier.

EXAMPLE 26

Preparation of Basecoat Composition

This basecoat was prepared as per EP 0038 127 B1 ex 4B using Stapa R507 (Trade name); 65% metal flake in hydrocarbon carrier, as the aluminium flake paste.

EXAMPLE 27

Preparation of Basecoat Composition

This basecoat was prepared as per EP 0 038 127 B1 ex. 4B using Silberline 5000 AR (Trade name); 65% metal flake is hydrocarbon carrier, as the aluminium flake paste.

Testing of Compositions 24 to 27

Panels were prepared from compositions 24 and 26 and tested as in example 1.7. The results are shown in Table 8.

Panels were prepared from compositions 24 to 27 and were tested as in examples 9.4 to 19.4; the 'Low Bake' (LB) results. Also prepared were panels using the same general method but omitting the final stoving at 70° C. for 20 minutes in their preparation of the panels, and instead allowing them to remain at ambient temperature for five hours prior to testing as given in 9.4 to −19.4; the 'Air Dry' (AD) results. The results are shown in Table 9.

TABLE 8

| B/C Example | B/C Film Thickness (μm) | Initial DOI | 24 Hrs BL | 24 Hrs DOI | 48 Hrs BL | 48 Hrs DOI | Recovered DOI |
|---|---|---|---|---|---|---|---|
| 24 A/D | 19 | 7 | 10 | 1 | 10 | 1 | 5 |
| 24 L/B | 20 | 5 | 10 | 0 | 10 | 0 | 4 |
| 26 A/D | 15 | 8 | 9D | 3 | 9D | 3 | 3 |
| 26 L/B | 15 | 8 | 9F | 2 | 9F | 3 | 3 |

TABLE 9

| B/C Example | B/C Film Thickness (μm) | Initial DOI | 24 Hrs BL | 24 Hrs DOI | 48 Hrs BL | 48 Hrs DOI | Recovered DOI |
|---|---|---|---|---|---|---|---|
| 24 A/D | 12 | 6 | 10 | 1 | 10 | 1 | 6 |
| 24 L/B | 16 | 5 | 10 | 1 | 10 | 1 | 6 |
| 25 A/D | 15 | 5 | 10 | 1 | 10 | 1 | 7 |
| 25 L/B | 15 | 5 | 10 | 2 | 10 | 2 | 7 |
| 26 A/D | 18 | 8 | 9D | 0 | 9D | 0 | 1 |
| 26 L/B | 20 | 8 | 9D | 0 | 9D | 0 | 0 |
| 27 A/D | 12 | 6 | 9D | 0 | 9D | 0 | 0 |
| 27 L/B | 15 | 8 | 9D | 0 | 9D | 0 | 0 |

We claim:

1. A base coat composition comprising a dispersion in an aqueous carrier for the composition of polymer microparticles, the polymer microparticles being a mixture of two different types of polymer microparticles:
   (a) 5 to 95% by weight of addition polymer microparticles having a crosslinked core and a stabilizing mantle containing salt forming groups, and
   (b) 95 to 5% by weight addition polymer microparticles having polyoxyalkylene stabilizer units derived from $C_{1-4}$ alkoxypolyoxyalkylene containing monomers, said composition being characterized by its ability to dry at a temperature in the range of ambient temperature to 80° C.

2. A composition according to claim 1 where the mixture comprises
   (a) 15 to 85% by weight of addition polymer microparticles having a crosslinked core and stabilizing mantle containing salt forming groups, and
   (b) 85 to 15% by weight of addition polymer microparticles having $C_{1-4}$ alkoxypolyoxyalkylene stabilizer units.

3. A composition according to claim 2 where the mixture comprises
   (a) 40 to 80% by weight of addition polymer microparticles having a crosslinked core and stabilizing mantle containing salt forming groups, and
   (b) 60 to 20% by weight of addition polymer microparticles having $C_{1-4}$ alkoxypolyoxyalkylene stabilizer units.

4. A composition according to claim 1 where the crosslinked core consists of a non-crosslinked seed portion surrounded by a crosslinked shell.

5. A composition according to claim 4 where the seed portion consists of polymethyl methacrylate.

6. A composition according to claim 4 where the seed portion consists of methyl methacrylate-butylacrylate co-polymer.

7. A composition according to claim 4 where the shell portion consists of units derived from the following monomers
   methyl methacrylate,
   butyl acrylate and
   allyl methacrylate.

8. A composition according to claim 1 where the salt-forming groups in the mantle are carboxyl groups.

9. A composition according to claim 1 where the mantle consists of units derived from the following monomers
   methacrylic acid
   hydroxyethyl acrylate and
   butyl acrylate
   and optionally butyl methacrylate.

10. A composition according to claim 1 where the mantle consists of units derived from the following monomers
    methacrylic acid
    butyl acrylate
    and optionally butyl methacrylate.

11. A composition according to claim 1 where the polymer microparticles (a) have additional polyoxyalkylene stabilizer units.

12. A composition according to claim 1 where the addition polymer microparticles (b) having polyoxyalkylene stabilizer units are derived from the following monomers
    butyl acrylate and styrene, or
    butyl acrylate and methyl methacrylate, or
    either of these optionally together with glycidyl methacrylate and the stabilizer units are derived from methoxypolyoxyethylene methacrylate or methoxypolyoxyethylene acrylate.

13. A composition according to claim 1 also containing a metallic pigment.

14. A composition according to claim 1 also containing a non-metallic inorganic or organic pigment.

* * * * *